Feb. 13, 1940.　　　T. E. MATTISON　　　2,190,411
SECTIONAL CRANKSHAFT
Filed March 14, 1939
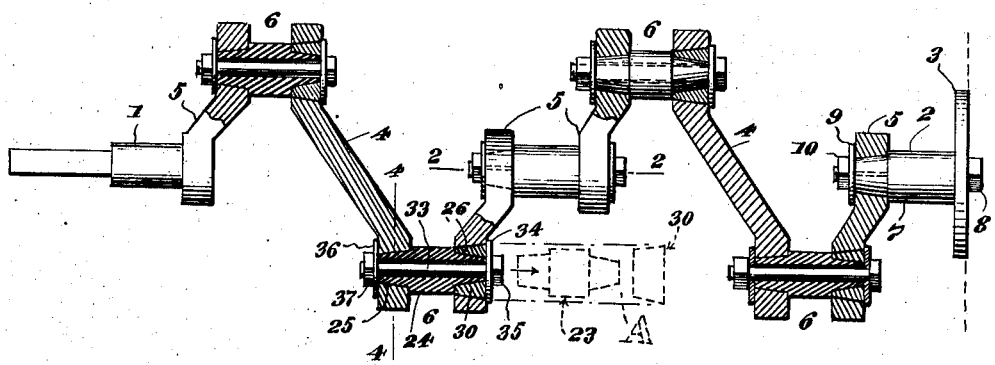
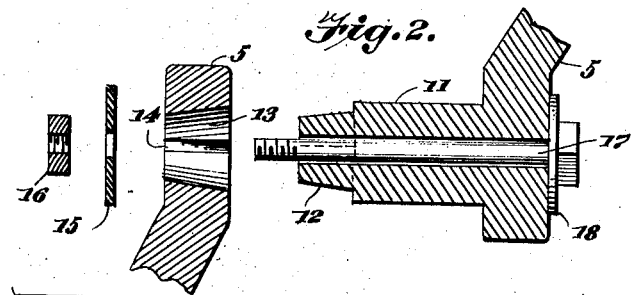
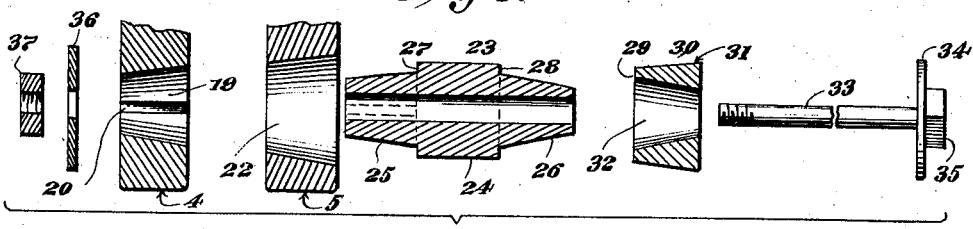
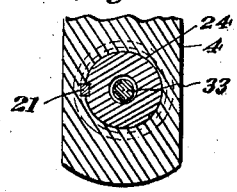
Inventor,
THOMAS E. MATTISON.
By E. E. Vrooman & Co,
His Attorneys.

Patented Feb. 13, 1940

2,190,411

UNITED STATES PATENT OFFICE 2,190,411

SECTIONAL CRANKSHAFT

Thomas E. Mattison, Northfield, Minn., assignor of twenty-five per cent to Berman G. Kielmeyer, and fifteen per cent to Albert J. St. Martin, both of Faribault, Minn.

Application March 14, 1939, Serial No. 261,827

3 Claims. (Cl. 74—597)

This invention relates to a sectional crankshaft.

An object of this invention is the construction of a novel sectional shaft which is comparatively inexpensive to manufacture, and which is relatively easy to repair because of the novel and peculiar constructions of the crank arms and the connecting units therefor.

Another object of the invention is the construction of a sectional crankshaft in which the connecting units are each capable of being bodily removed longitudinally of the shaft from off the particular pair of crank arms that said connecting unit unites.

With the foregoing and other objects in view, the invention comprises certain novel constructions, combinations, and arrangements of parts, as will be hereinafter fully described, illustrated in the accompanying drawing, and more particularly pointed out in the appended claims.

In the drawing:

Figure 1 is a view partly in elevation and partly in longitudinal section of a sectional crankshaft constructed in accordance with the present invention.

Figure 2 is an enlarged sectional view taken on line 2—2, Fig. 1, and showing some of the parts separated.

Figure 3 is an enlarged longitudinal sectional view of one of the connecting units, showing the parts separated.

Figure 4 is an enlarged sectional view taken on line 4—4, Fig. 1.

Referring to the drawing, in which I have shown the preferred embodiment of my invention, I designates the front main journal and 2 is the rear main journal. Associated with journal 2 is the fly wheel flange 3. There are shown in Fig. 1 a plurality of primary crank arms 4 and a plurality of auxiliary crank arms 5. Each two contiguous primary and auxiliary crank arms are connected by a connecting unit 6. The extreme right hand auxiliary crank arm 5, nearest to the fly wheel flange 3 is mounted on a cone extension 7 of the journal 2. A bolt 8 extends through flange 3, journal 2, and on the inner end of bolt 8 is a washer 9 and a nut 10, whereby this extreme right hand crank arm 5 is securely retained upon journal 2.

The contiguous central auxiliary crank arms 5 (Fig. 2) are connected by means of an integral sleeve 11, which extends from the auxiliary crank arm 5 as shown in Fig. 2; this sleeve 11 is provided on its outer end with an integral cone 12, which cone fits into the conical socket 13 formed on the auxiliary crank arm 5, with a key slot 14, formed in said conical socket 13; this arrangement is also clearly seen in Fig. 4. When the parts of Fig. 2 are assembled tightly, as shown in Fig. 1, the cone extension 12 is in the conical socket 13 and the washer 15 and nut 16 are on the threaded end of bolts 17. A washer 18 is on bolt 17 against its head.

Each connecting unit 6 and its associated crank arms is similarly constructed (there are shown four of these connecting units 6); therefore, it will only be necessary to specifically describe one connecting unit. The connecting unit 6 (see Fig. 3) comprises a primary crank arm 4 which is provided with a conical socket 19, and socket 19 is provided with a slot 20, for receiving a spline or pin 21 (Fig. 4). The auxiliary crank arm 5 is provided with a large conical socket 22; it is to be particularly noted that these two sockets 19 and 22 extend in the same direction, that is, the smaller end of socket 22 is contiguous to the larger end of socket 19 for the very special reason, hereinafter specified. The journal sleeve 23 comprises a cylindrical body 24 with an integral primary conical end 25 and an integral auxiliary conical end 26. The primary end 25 is necessarily thicker for snugly fitting the socket 19; this cone end 25 is larger through than the auxiliary cone end 26. The cone end 25 is provided with an annular shoulder 27, which shoulder fits against the side wall of the engaged crank arm; not so with the annular shoulder 28 of the cone end 26, for shoulder 28 fits only against end 29 (Fig. 3) of the cone collar 30. Cone collar 30 is provided with a tapering outer wall 31 and with a conical socket 32. This cone collar fits snugly upon the auxiliary cone end 26, with the inner end of wall 31 registering with the outer face of body 24, as clearly shown in Fig. 1. A bolt 33 extends through the assembled parts of the connecting unit, with washer 34 thereon, against the head 35, and washer 36 and nut 37 are on the threaded end of bolt 32, when the parts are assembled, thereby securely holding same in an efficient operating condition.

When any one of the connecting units requires inspection, or repair, the particular unit can be removed longitudinally of the sectional crankshaft, as is clearly illustrated by dotted lines A, Fig. 1. This permits of inspection or repair work of the particular connecting unit without disturbing the other parts or units of the entire shaft. This longitudinal body removement is accomplished by loosening the nut 37 and then removing the bolt 33, whereupon not only can the cone collar be removed from the large cone socket 22.

but the entire journal sleeve 23 can be slid through the socket 22, which is a very efficient operation as the positioning of the supporting crank arms need not be interfered with, since they can retain their normal spaced relation, without any separating action of said crank arms being necessary. This novel connecting unit 6 permits easy repair of a sectional crankshaft construction according to the present invention because of the easy manipulation of the connecting units, and their ready accessibility to the mechanic.

The connecting units 6 are adapted for receiving roller bearings on their outer surfaces (not shown). Any style or form of roller bearings may be employed, common to this art, that the constructor or operator desires.

While I have described the preferred embodiment of my invention and illustrated same in the accompanying drawing, certain changes or alterations may appear to one skilled in the art to which this invention relates during the extensive manufacture of same, and I, therefore, reserve the right to make such changes or alterations as shall fairly fall within the scope of the appended claims.

What I claim is:

1. In a sectional crankshaft, the combination of a pair of contiguous crank arms, one of said crank arms provided with a small socket and the other crank arm provided with a large socket, a journal sleeve having a portion closing said small socket, said journal sleeve also having a portion extending into the large socket, means fastening said journal sleeve upon said crank arms, and said journal sleeve being adapted to bodily move out of said small socket and entirely through said large socket for removal of said crank arms.

2. In a sectional crankshaft, the combination of a pair of crank arms provided with conical sockets of different diameters and extending in the same directions, a journal sleeve in said conical sockets, one end of said sleeve filling one conical socket, a cone sleeve around the other end of said journal sleeve and within a conical socket, said journal sleeve being adapted to bodily move its entire length out of said socket containing said cone sleeve, and fastening means holding said journal sleeve, cone sleeve and crank arms securely together.

3. In a sectional crankshaft, the combination of a pair of crank arms, one crank arm provided with a small conical socket and the other crank arm provided with a large conical socket, the narrow end of said large conical socket contiguous to the wide end of the small cone socket, a journal sleeve provided with a relatively thick primary cone end fitting snugly within said small cone socket, said primary cone end provided with an annular shoulder fitting against the side face of a crank arm, said journal sleeve provided also with an auxiliary cone end, said auxiliary cone end being thinner than said primary cone end, said auxiliary cone end fitting within said large conical socket, a cone collar on said auxiliary cone end within said large conical socket, the outer face or wall of said cone collar registering at its inner end with the outer face of said journal sleeve, whereby said cone collar and journal sleeve can be bodily removed through said large conical socket longitudinally of the crankshaft, and means fastening said journal sleeve, cone collar and the engaged crank arms together.

THOMAS E. MATTISON.